United States Patent [19]

Jacob

[11] Patent Number: 4,641,922
[45] Date of Patent: Feb. 10, 1987

[54] LIQUID CRYSTAL PANEL SHADE

[75] Inventor: Keith D. Jacob, Ann Arbor, Mich.

[73] Assignee: C-D Marketing, Ltd., Ann Arbor, Mich.

[21] Appl. No.: 527,435

[22] Filed: Aug. 26, 1983

[51] Int. Cl.⁴ .......................... G02F 1/13; G02F 1/135
[52] U.S. Cl. .................................. 350/331 R; 350/334
[58] Field of Search ............. 350/276 R, 25 LA, 278, 350/279, 284, 331 R, 336, 338, 357, 334

[56] References Cited

U.S. PATENT DOCUMENTS

| | | | |
|---|---|---|---|
| 3,040,625 | 6/1962 | Zito | 350/336 X |
| 3,473,863 | 10/1969 | Lewis | 350/276 R |
| 3,727,527 | 4/1973 | Borowski et al. | 350/331 R X |
| 3,816,786 | 6/1974 | Churchill et al. | 350/336 X |
| 3,834,794 | 9/1974 | Soref | 350/336 X |
| 3,862,798 | 1/1975 | Hopkins | 350/279 X |
| 3,961,181 | 6/1976 | Golden | 350/331 R |
| 4,088,392 | 5/1978 | Meyers | 350/357 X |

FOREIGN PATENT DOCUMENTS

| | | | |
|---|---|---|---|
| 0584450 | 1/1959 | Canada | 350/276 R |
| 2808260 | 8/1979 | Fed. Rep. of Germany | 350/278 |
| 2428264 | 2/1980 | France | 350/276 R |
| 2502351 | 9/1982 | France | 350/276 R |
| 2029343 | 3/1980 | United Kingdom | 350/278 |

Primary Examiner—John K. Corbin
Assistant Examiner—David Lewis
Attorney, Agent, or Firm—Rhodes and Boller

[57] ABSTRACT

A liquid crystal panel shading system is disclosed in which the light transmission characteristics of a liquid crystal panel are varied to produce desired shading effects. The preferred embodiment is disclosed in the application to a windshield sun visor for an automotive vehicle. The panel may be a separate element applied against the existing windshield or it may be integrally incorporated into the windshield. The panel is constructed with a tapered shape, which in association with a control, is effective to produce zones of varying light transmission characteristics to produce new and unique modes of shading.

11 Claims, 11 Drawing Figures

LIQUID CRYSTAL PANEL SHADE

BACKGROUND AND SUMMARY OF THE INVENTION

This invention relates to a shading system for an automotive vehicle in which a liquid crystal panel (LCP) is associated with an automobile window to provide selective shading of the occupant space from external light sources. In the preferred embodiment disclosed herein the liquid crystal panel is associated with the windshield to function in the manner of a sun visor.

The prior art contains various approaches to the problem of shading an occupant of an automobile from external light sources such as the sun. There are of course conventional sun visors which consist of materials which completely block sunlight. Necessarily, such sun visors also block the view along the line of sight on which they are disposed.

Other shading techniques previously proposed are somewhat more elaborate and may be considered as comprising the following general categories: (1) Prismatic systems in which glare is reduced by prismatic elements having different indicies of refraction including liquidcontaining prisms; (2) Shutter systems in which mechanical shutters are selectively operable to control shading; (3) Photochromic systems in which photochromic material respond to changes in incident light so as to increasingly darken in response to higher intensities of light and to become less dark in response to lower intensities of light; (4) Tinted liquid systems in which tinting is controlled by tinted liquid pumped between window glass panes; and (5) Polarizer systems containing light polarizers. Examples of these general types of systems are identified by the following U.S. Pat. Nos.: 3,324,469; 2,423,322; 3,400,972; 3,368,862; 3,695,681; 2,423,322 and 2,562,895.

There have also been previous attempts in applying liquid crystals to window panes. These are represented by U.S. Pat. Nos. 3,961,181; 3,986,022 and 4,268,126.

The present invention is directed to a new liquid crystal panel and system well suited for automotive applications. When specifically applied to the windshield of an automobile in replacement of conventional sun visors, new and unique modes of operation are obtained. More specifically, these new and unique modes of operation relate to the manner in which the liquid crystal panel becomes selectively shaded. Several embodiments of the invention are disclosed and shading may be manually set by the user and/or automatically. The intensity of shading may be made different at different areas of the liquid crystal panel by virtue of a new and unique construction for the liquid panel itself. The invention provides a further capability whereby the extent of the shading may be readily set by the occupant to establish a shading pattern which will bear a desired relationship to the eyes. This is accomplished by the occupant simply setting a conveniently accessible control without the necessity of mechanically adjusting the liquid crystal panel such as required in the adjustment of a conventional sun visor.

In order to promote efficiency in today's automobiles, aerodynamic considerations are of major significance. Aerodynamic considerations impose constraints on certain automobile windshield designs. Attempts to apply conventional shading type devices such as conventional sun visors to such aerodynamically styled windshields may pose certain problems. For example, if the windshield is inclined more toward the horizontal, a large sun visor will be required to provide an equivalent shading pattern for the occupant if it is desired to position the visor as close to the windshield as possible. While this will increase the cost of the sun visor, it makes stowage of the sun visor especially difficult. Because today's automobiles are generally of smaller size than in recent times, more severe constraints are imposed on the available space for sun visors. Moreover, the conventional type of sun visor does not afford any capability for varying the degree of shading because it is completely light blocking. Furthermore, safety considerations must be addressed when designing sun visors since they must not pose an unreasonable interior hazard in the event of collision. Yet in spite of these various constraints performance considerations dictate that a sun visor must be capable of providing adequate shading and it must be convenient to operate when its usage is required. Conventional sun visors do not seem capable of providing the best solution.

With the present invention, many of the disadvantages associated with prior types of sun visors can be eliminated. For one, the packaging of the sun visor may be made considerably more compact. The present invention in one respect contemplates the incorporation of the liquid crystal panel sun visor as a non-movable panel applied to one side of the windshield over a selected area thereof, or alternatively integral incorporation of the liquid crystal medium into the windshield. With these two possibilities, interior space is more efficiently used than would be the case if conventional fold away type sun visors are employed. This results in important safety and use benefits. Moreover, the control system for the liquid crystal panel provides new and unique modes of operation, and the preferred form of liquid crystal panel itself has a new and unique shape which contributes to new and unique modes of operations.

Although the invention is disclosed in the preferred embodiment as applied to a windshield sun visor of an automotive vehicle, principles of the invention may be extended to other applications.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
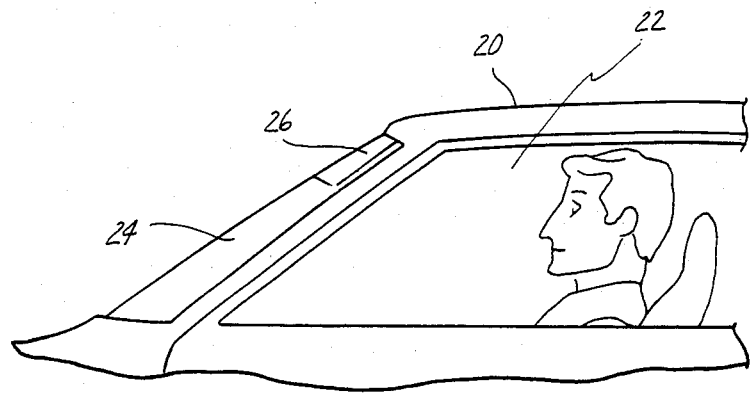
FIG. 1 is a fragmentary side elevational view illustrating application of the invention to the windshield of an automotive vehicle.
Figure 2:
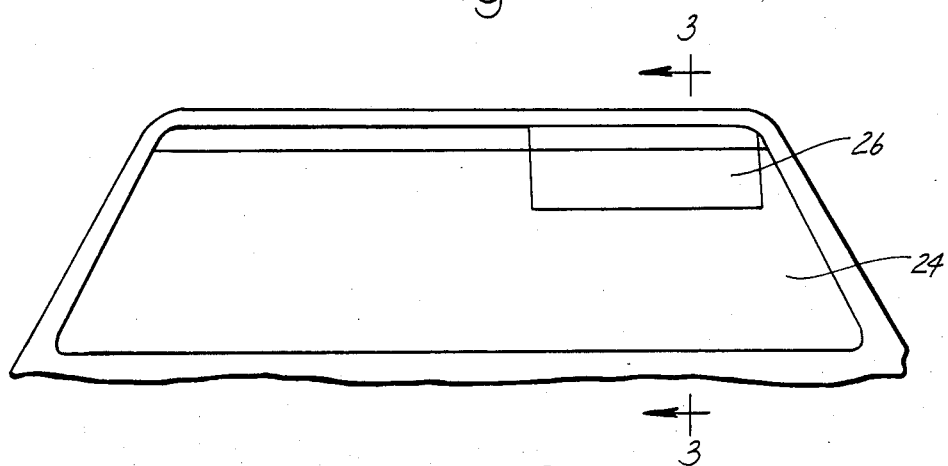
FIG. 2 is a front view of FIG. 1.
Figure 3:
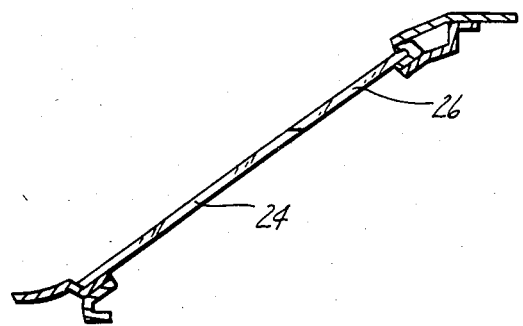
FIG. 3 is a vertical sectional view taken substantially in the direction of arrows 3—3 in FIG. 2.

FIGS. 1, 2, and 3 illustrate an automobile 20 having an occupant compartment 22. A glass windshield 24 provides a forward field of view to an occupant in the direction of forward travel of the automobile.

A sun visor in the form of a liquid crystal panel (LCP) 26 is disposed in association with windshield 24 to provide selective shading for an occupant of the vehicle. For purposes of explanation one such panel 26 is illustrated in the FIGS. 1, 2, and 3 disposed at one side of the windshield. The exact shape and the number of panels involved will depend upon the requirements for the particular vehicle. For example there could be two LCP's 26 on opposite sides of the windshield, one for the driver and one for a front seat passenger.

LCP 26 may be a separate panel disposed against a surface of the windshield such as the interior surface Alternatively, the liquid crystal panel may be incorporated integrally with the windshield. Details of the construction of the LCP will be explained later on.

LCP 26 comprises a liquid crystal medium which occupies a very narrow space between transparent panes. Where the LCP is a separate panel disposed against windshield 24, one of the panes of the liquid crystal panel is disposed against the windshield. Where the LCP is integrally incorporated into the windshield, the liquid crystal medium may be disposed between panes forming the windshield.

The use of the term liquid crystal medium is intended in a comprehensive sense to include all liquid media which possess a property whereby the opaqueness of the medium is a function of an electric field applied to the medium between spaced apart electrodes. Hence, the term includes what are commonly referred to as liquid crystals and dichroic crystals among others.

The illustrated example has an area essentially corresponding to the area which would be assumed by a conventional light-blocking sun visor which has been operated to the same position. Unlike conventional sun visors however, the LCP 26 associated with windshield 24 is intended to remain in place. Hence, it does not intrude into the interior occupant space 22 except to the extent that it may be a separate panel applied against the interior surface of windshield 24. Unlike a conventional light blocking sun visor, it does not require stowage, nor must provision be made to allow clearance space for operating the sun visor from the stowed position to positions of use.

Figure 4:
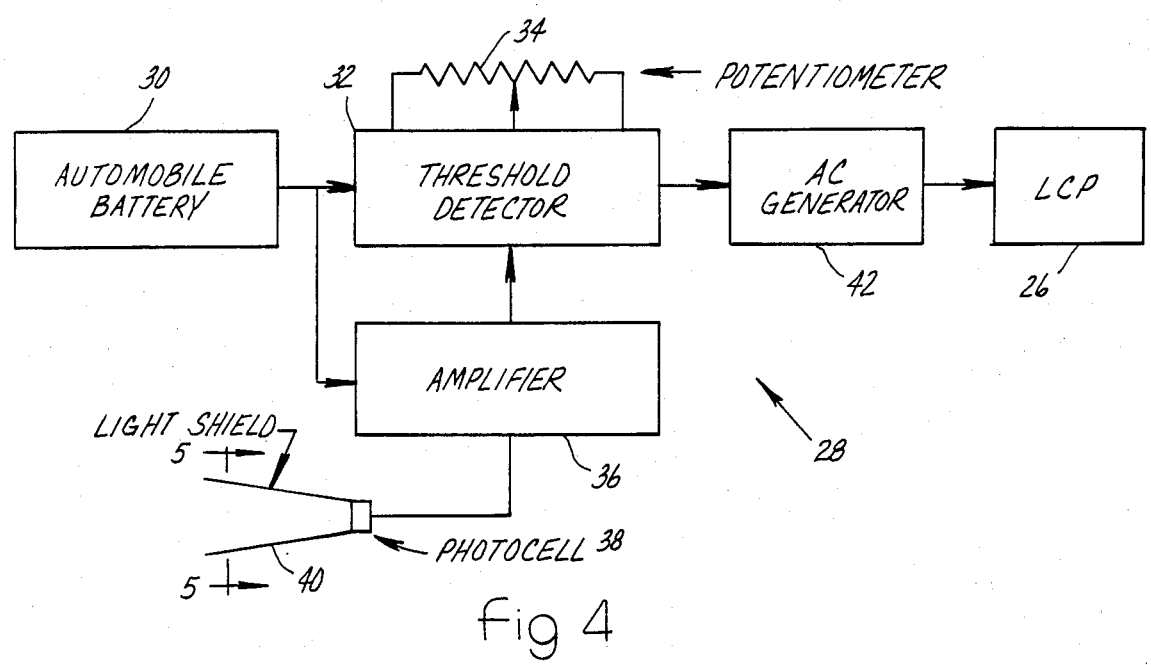
FIG. 4 is an electrical schematic diagram, in block diagram form, of a control system for the liquid crystal panel of FIGS. 1 through 3.

FIG. 4 illustrates the general organization and arrangement of a control 28 for LCP 26. The control is operatively associated with the existing automobile battery 30 which provides power for the control and LCP.

Control 28 comprises a threshold detector 32, a potentiometer 34, an amplifier 36, a photocell 38, a light shield 40, and an AC generator 42 operatively associated in the manner depicted in FIG. 4. The circuits depicted by these components are conventional known circuits.

Potentiometer 34 is operable to set a desired threshold level for threshold detector 32. Amplifier 36 amplifies the signal of photocell 38, and the amplified photocell signal is compared by threshold detector 32 against the reference set by potentiometer 34. When the amplified photocell signal exceeds the threshold level, AC generator 42 is activated to cause an AC voltage to be applied to LCP 26.

Photocell 38 is disposed on the vehicle in a suitable position to sense the intensity of light from a particular direction. Light shield 40 serves to more precisely define the direction from which photocell 38 is effective to sense light. For purposes of shading the eyes of the vehicle occupant from the sun, the light shield 40 and photocell 38 are arranged to face generally toward the front of the vehicle. The light shield as viewed in FIG. 4 has a tapered shape, tapering outwardly away from photocell 38. The light shield and photocell are positioned at an appropriate vertical inclination so that the range of amplified signals delivered by amplifier 36 to threshold detector 32 corresponds to an expected range of positions of the sun which would be deemed objectionable to the vehicle occupant. The potentiometer 34 affords the occupant the capability to select a particular point within this range. To a certain extent this will be able to compensate for not only individual occupant preferences, but also for the occupant's size. It can be appreciated that occupant size is a factor because a shorter person's eyes may be at a lower level in relation to LCP 26 than might be the eyes of a taller person.

The AC energizing potential delivered from AC generator 42 to LCP 26 when shading is called for is delivered to the LCP by means of suitable conductors. Preferably such conductors are made to be as inconspicuous as possible so as not to create any appreciable interference with the field of view. The application of the AC signal to LCP 26 is effective to cause the LCP to switch from a transparent state to an opaque state. In the opaque state, the LCP is effective to block sunlight and thereby provide shading to the interior space, expectedly including the eyes of the occupant. Hence, this type of control may be considered as an on-off type control with automatic operation once a preset level of incident light is detected. Variations on this scheme may be embodied in other applications of the invention.

Figure 6:
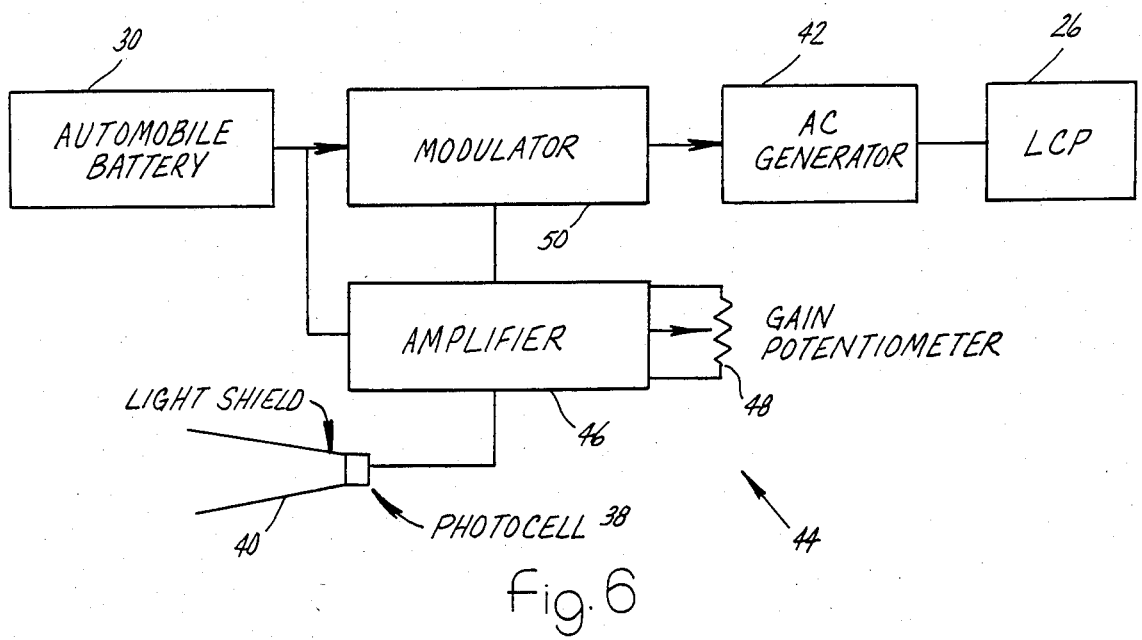
FIG. 6 is an electrical schematic diagram, in block diagram form, illustrating another form of control system for the liquid crystal panel.

FIG. 6 illustrates a further type of control 44. Control 44 comprises several of the same components used in system 28 and these components are similarly identified and numbered. Constructionally the difference between the two systems 28 and 44 is that in system 44 an amplifier 46, a gain potentiometer 48 and a modulator 50 replace threshold detector 32, potentiometer 34 and amplifier 36 in the FIG. 4 embodiment of control 28.

The control of FIG. 6 is referred to as a proportional control for the reason that the degree of opaqueness which is imparted to LCP 26 by AC generator 42 is roughly proportional to the intensity of the incident light which is detected by photocell 38. Stated another way, the light transmission characteristic of LCP 26 is approximately inversely proportional to the level of light which is detected by photocell 38.

In operation control 44 causes the incident light signal developed by photocell 38 to be amplified by amplifier 46. The amplification factor is a function of the setting of gain potentiometer 48 as set by the occupant. The applified signal is supplied to modulator 50 which in turn modulates AC generator 42. This causes the AC voltage applied to the LCP 26 to be selectively modulated in accordance with the amplified signal supplied to modulator 50 from amplifier 46. This mode of operation is contrasted with the on-off type of operation of FIG. 4 where the AC generator was either on or off. The provision of gain potentiometer 48 provides the occupant control over the degree of opaqueness which is imparted to the LCP by the control for any given level of incident light detected by photocell 38.

Figures 7, 8:
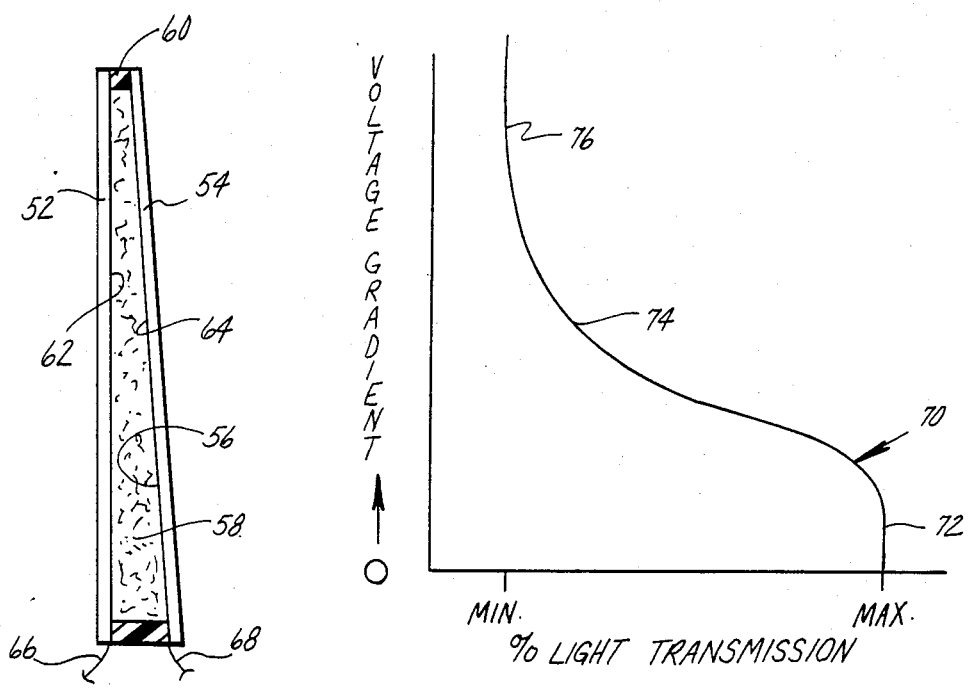
FIG. 7 is a sectional view on an enlarged scale looking in the same direction as FIG. 3 and illustrating one form of liquid crystal panel.
FIG. 8 is a graph plot useful in explaining principles of the invention.

FIG. 7 is a vertical cross sectional view through LCP 26. The construction comprises spaced apart clear transparent glass sheets 52 and 54. These glass sheets bound opposite sides of a narrow space 56 which is filled with a suitable liquid crystal material 58. The perimeters of the two sheets 52 and 54 are enclosed by a suitable sealing structure 60. Electrode structures 62 and 64 are applied respectively to the inner surfaces of sheets 52 and 54. Appropriate electrical conductors 66 and 68 pass through and are ensealed with respect to sealing structure 60 to provide for the application of voltage across the two electrode structures 62 and 64. The application of such a potential difference across the liquid crystal medium 58 within space 56 will be effective to control the light transmission characteristics of the liquid crystal medium and thereby control the light transmission characteristics of the liquid crystal panel 26. The organization and arrangement of the liquid crystal panel shown in FIG. 7 provides a new and unique mode of operation resulting in new and unique shading capabilities when applied for this purpose.

It will be observed in FIG. 7 that the two glass sheets 52 and 54 are in a non-parallel relation with each other. Specifically, the two sheets are arranged such that the distance between the two progressively increases from top to bottom. As such, the thickness of the liquid crystal medium similarly increases from top to bottom.

It should be noted parenthetically that the overall shape of the liquid crystal panel may be nonplanar so as to conform the liquid crystal panel to the contour of the windshield. Hence, the cross section of FIG. 7 should be considered representative and should not be interpreted as meaning that the sheets 52 and 54 are necessarily flat over their full areas. Such curved sheets may be manufactured in accordance with conventional manufacturing procedures.

Because of the downwardly increasing spacing of the two sheets 52 and 54, the spacing distance between the electrodes 62 and 64 similarly downwardly increases. For a given magnitude of voltage applied via conductors 66 and 68 to electrodes 62 and 64, the construction of the LCP 26 will result in a voltage gradient whose magnitude progressively decreases from top to bottom. This characteristic may be used to advantage in association with a control system when applied to an automobile sun visor application.

FIG. 8 illustrates a graph plot typical of liquid crystal panels. Specifically it relates the percentage light transmission of the liquid crystal medium to the voltage gradient. The horizontal axis represents light transmission in terms of percentage. The vertical axis represents voltage gradient. The voltage gradient increases in the direction away from the origin and the percentage of light transmission also increases in the direction away from the origin.

The graph plot is intended to depict a general characteristic of a representative liquid crystal medium and should not be construed as necessarily being that of any specific liquid crystal medium. The graph plot is identified by the general reference numeral 70 and may be considered as comprising three segments 72, 74, and 76.

At zero voltage gradient, meaning no voltage applied to the liquid crystal medium, it exhibits maximum light transmission characteristics, (i.e. clear). This is represented by graph plot segment 72.

As the voltage gradient increases above a certain threshold level, the light transmission characteristic changes such that the liquid crystal material begins to become increasingly opaque. The segment of the graph plot which defines the increasing opaqueness with increasing voltage gradient is represented by the reference numeral 74.

A point is finally reached where minimum light transmission (i.e. maximum opaqueness) is attained. For all voltage gradients above this level, there is essentially no further increase in the opaqueness. This is represented by the graph plot segment 76. Thus, the graph plot segment 76 may be considered as a saturation region of the liquid crystal medium.

Figure 9:
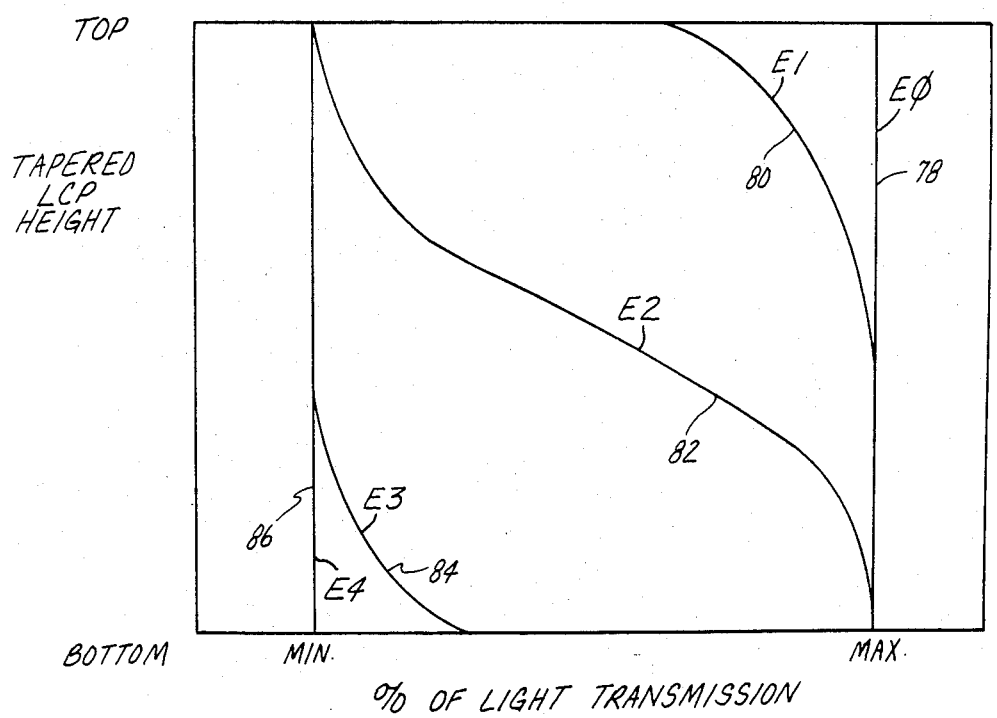
FIG. 9 is another graph plot useful in explaining principles of the invention with reference to FIG. 7.

While graph plot 70 relates to the liquid crystal medium itself, the graph plot of FIG. 9 illustrates the characteristic of the tapered liquid crystal panel of FIG. 7. The horizontal axis of FIG. 9 represents the light transmission characteristic in terms of percentage of light transmission. The vertical axis represents the height of the tapered liquid crystal panel extending from bottom to top. Characteristics of the tapered liquid crystal panel are defined, for purposes of illustration, by five representative graph plots 78, 80, 82, 84, and 86. Each graph plot 78, 80, 82, 84, and 86 defines the light transmission characteristic of the tapered liquid crystal panel along its height for a given potential difference applied via conductors 66 and 68 to electrodes 62 and 64. The voltage associated with the respective graph plots are identified by E0, E1, E2, E3, and E4 and are in the order of increasing voltage.

The voltage E0 would represent a voltage which would give rise to voltage gradients along the entire height of the liquid crystal panel corresponding to the segment 72 of graph plot 70 of FIG. 8. This would mean that the liquid crystal panel exhibits maximum light transmission throughout.

The appication of voltage E1 to the liquid crystal panel will not increase the voltage gradients along approximately the lower half of the liquid crystal panel above a level corresponding to segment 72 of graph plot 70 but will result in voltage gradients over the upper half of the liquid crystal panel which fall on segment 74 of graph plot 70. Hence, the light transmission of the upper half of the liquid crystal panel will progressively decrease toward the top of the liquid crystal panel.

Application of the voltage E2 will produce a characteristic in which there is a certain degree of opaqueness throughout essentially the entire liquid crystal panel. The opaqueness will progressively increase from bottom to top of the liquid crystal panel, exhibiting maximum transmission at the bottom and maximum opaqueness at the top.

Application of the voltage E3 to the tapered liquid crystal panel will result in approximately the upper half of the panel exhibiting maximum opaqueness corresponding to segment 76 of graph plot 70. The lower half of the liquid crystal panel will exhibit opaqueness which decreases from maximum.

Application of voltage E4 will result in full saturation throughout so that the liquid crystal panel becomes of maximum opaqueness throughout.

It will be appreciated that the series of graph plots depicted in FIG. 9 are merely representative and should not necessarily be construed as representing any particular liquid crystal medium. Indeed there will be for each discrete value of voltage applied to the liquid crystal panel between the voltages represented by E0 and E4 an individual graph plot corresponding to each such voltage.

The illustrated tapered liquid crystal panel has a particular taper. By varying the taper and/or the characteristics of the liquid crystal medium employed in the liquid crystal panel, variations in the characteristic represented by FIG. 9 are attainable.

Figure 10:
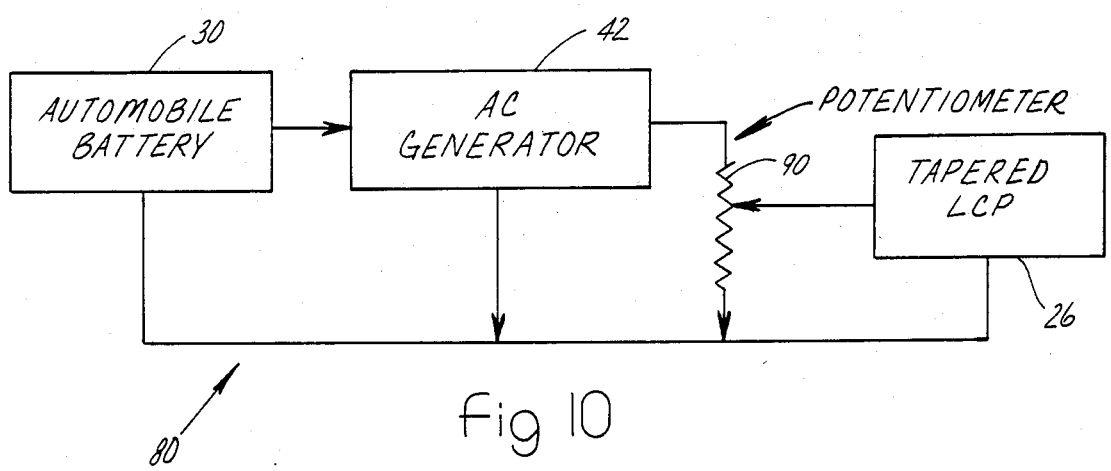
FIG. 10 is an electrical schematic diagram, in block diagram form, illustrating a control for the liquid crystal panel of FIG. 7.

FIG. 10 illustrates a control 88 which may be used in association with the tapered liquid crystal panel. Control 88 is powered by the automobile battery 30 and it includes AC generator 42 for operating the tapered liquid crystal panel. Rather than the output of AC generator 42 being directly connected to the liquid crystal panel as in the preceeding controls, the output of AC generator 42 in control 88 is coupled to the tapered liquid crystal panel through a potentiometer 90. The full output voltage of AC generator 42 is applied across the ends of the potentiometer while the potentiometer wiper and one end of the potentiometer are connected to the electrodes 62 and 64 of the tapered liquid crystal panel. The vehicle occupant can adjust the potentiometer wiper to in turn apply a desired voltage to the liquid crystal panel corresponding to a desired voltage between the levels E0 and E4 so as to enable the liquid crystal panel to be operated in a desired manner among the various possibilities such as those depicted in FIG. 9.

The operational capability afforded by control 88 of the tapered liquid crystal panel on the windshield may be analogized to the operation of a conventional rollup-rolldown type windowshade, but without moving parts. Consider that maximum opaqueness represents the windowshade. By adjusting potentiometer 90 the occupant can establish the extent to which the shade is rolled up or down. Below the lower edge of the maximum opaqueness region there will be a progressively increasing light transmission characteristic. Thus in the application to an automobile suh visor, the adjustment may be conveniently made by simply adjusting the potentiometer. This allows quick adjustment to accommodate the eye level of the occupant in relation to the elevation of the sun. It should also be pointed out that variations may be indulged in, resulting in other than a uniformly tapered liquid crystal panel and various modes of operation may be obtained depending upon variations in the thickness of the liquid crystal medium at different areas of the liquid crystal panel.

The control of FIG. 6 may also be used in conjunction with the tapered liquid crystal panel to produce a mode of operation which is automatically controlled by a photocell, with the operator setting the relative level via the gain potentiometer.

Figure 11:
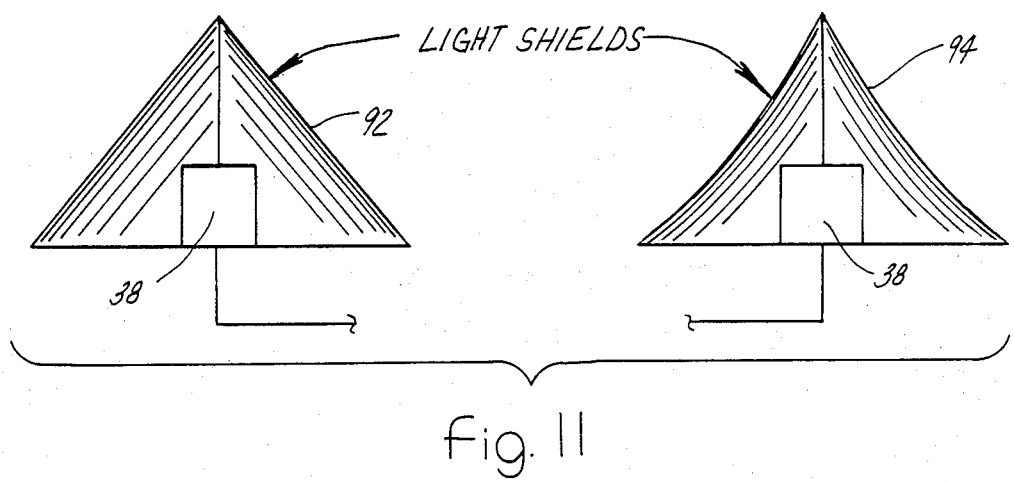
FIG. 11 is a view illustrating further details useful in the application of the liquid crystal panel to an automobile.

An advantageous arrangement for monitoring the incident light which is to be shaded is shown in FIG. 11. In place of the light shield shown in FIG. 6, a differently shaped light shield is employed. The light shield would have in general the same type of vertical taper as in FIG. 6 insofar as vertical elevation is concerned, but when viewed from the front the opening will have a tapering shape from top to bottom such that the opening has a greater width at the bottom than at the top.

Figure 5:
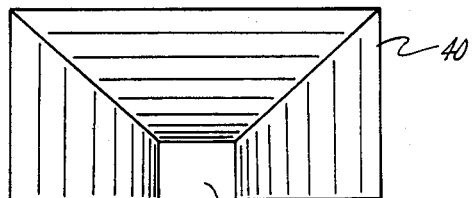
FIG. 5 is a view on a slightly enlarged scale taken in the direction of arrows 5—5 in FIG. 4.

FIG. 11 is a view taken in the same direction as the view of FIG. 5. It illustrates two light shields 92, 94 respectively which are associated with control of respective liquid crystal panels 26 (not shown in FIG. 11). The left-hand light shield 92 in FIG. 11 illustrates a triangular shaped opening in which all three sides are straight. The right-hand light shield 94 depicts a triangular shape in which the bottom edge is straight but the side edges are curved, being dished inwardly. The taper of the left-hand light shield is such that the width of the opening progressively uniformly increases from top to bottom whereas the right-hand light shield opening has a relationship in which the increase is not a linear function from top to bottom.

There is a particular relationship which relates each light shield of FIG. 11 to the position of the corresponding occupant's eyes in relation to the windshield. Each light shield of FIG. 11 is so arranged that when the sun is at an elevation where it is in alignment with the top edge of the windshield and the corresponding occupant's eyes, it is also aligned with the top outer edge of the light shield and the detection area of the photocell. As the elevation of the sun above the horizon decreases from this point, more and more of the sunlight is allowed to fall on the photocell by virtue of the downwardly increasing taper of the light shield opening which is shown in FIG. 11. Consequently, the shading of the tapered liquid crystal panel is automatically adjusted to follow the sun such that the lower edge of the zone of maximum opaqueness remains at a level where the zone of maximum opaqueness fully comes between the occupant's eyes and the sun.

Stated another way, the output of the photocell is proportional to the brightness of the sun and the angle of the sun. Direct sunlight reaching the photocell is maximum at the horizon decreasing to zero when the sun is just above the top of the windshield relative to the driver's eyes, at an angle of about 30°, for example.

The photocell output is amplified by amplifier 46, the gain being set by potentiometer 48, and supplied to modulator 50. The modulator supplies DC output power which is in proportion to the photocell output. The AC generator output is an AC voltage whose magnitude is proportional to the DC received from the modulator.

Therefore, as the sun's elevation decreases, the AC voltage supplied to the tapered liquid crystal panel increases and the light transmission of the tapered liquid crystal panel decreases from the top downward as indicated by FIGS. 7, 8, and 9.

With the correct shaping of each light shield and/or the taper of the tapered liquid crystal panel, the lower end of the minimum light transmission zone of the tapered liquid crystal panel will track the sun as the relative elevation angle of the sun to the vehicle changes. The exact dimensioning and sizing may be developed through application of known computational techniques. Thus, in the preferred mode of operation the shading system is effective to provide a shading pattern which automatically tracks the sun so that the occupant's eyes are always just being shaded by the zone of maximum opaqueness. While this is certainly a preferred mode of operation, alternate modes of operation are possible if desired.

The arrangement may also have a similar adjustment capability to that described above whereby the light shield may be adjusted in elevation angle to produce a desired relationship to a particular individual's eyes to accommodate individuals of different height. The photocell control remains effective, once the light shield has been adjusted, so as to keep the individual's eyes just shaded by the zone of maximum opaqueness as the sun's elevation changes.

Based upon the foregoing description, the reader will perceive that new and unique modes of operation for a liquid crystal panel shading system have been developed. When applied to an automotive sun visor application, a significant improvement is obtained over conventional mechanical type sun visors. The invention provides convenient occupant adjustment, efficient use of interior space, and the possibility for obtaining shading zones corresponding to desired automotive specifications. Principles of the invention may also be extended to other applications such as shading of headlights, sun roof panels and windows other than windshields.

Although FIG. 7 shows the electrical connections to be at the bottom of the panel, connections alternatively can be made at the top and concealed within the windshield header. In such a construction the sheets 52, 54 may be extended above the upper edge of seal 60, and electrical clips clamped onto the sheets to make electrical connection to the ultra-thin layers of conductor deposited over the entirety of the confronting faces of the sheets.

The particular tapers of the light shields which have been shown are merely representative of several possibilities. It is contemplated that other tapers may be used; for example the sides could be dished outwardly rather than inwardly or straight.

While a preferred embodiment of the invention has been disclosed, it will be appreciated that principles are applicable to other embodiments.

What is claimed is:

1. In combination with a vehicle having a window through which sunlight shines into an interior occupant space of the vehicle, an electrically controllable sun shade comprising a liquid crystal medium disposed as a layer having a area of expanse overlying a certain area of the window of a vehicle to provide for sun shading of an occupant, said liquid crystal medium having an electro-optical characteristic wherein the degree of opaqueness is correlated with the voltage gradient existing at any point in the medium, a pair of electrodes bounding the area of expanse of liquid crystal medium on opposite sides, means for creating a selectable voltage across said electrodes, and hence across the area of expanse of said liquid crystal medium layer, and means for creating from said selectable voltage desired sun shading patterns within the interior space on the occupant by creating different voltage gradients at different locations over the area of expanse of the liquid crystal medium layer wherein the different voltage gradients result from the liquid crystal medium layer having different thicknesses at different locations over its area of expanse corresponding to the desired sun shading patterns to be achieved within the interior space.

2. The combination set forth in claim 1 in which said certain area of the window has a vertically downward component to its area of expanse and the thickness of the liquid crystal medium progressively increases along that vertically downward component of expanse, and including a control associated with the medium for selectively setting the downward extent of a zone of opaqueness provided by the medium.

3. In combination with the windshield of a vehicle through which sunlight shines into an interior space of the vehicle, an electrically controllable shade comprising a liquid crystal medium disposed as a layer having an area of expanse overlying a certain area adjacent the top of the windshield, said liquid crystal medium having an electro-optical characteristic wherein the degree of opaqueness is correlated with the voltage gradient existing at any point in the medium, a pair of electrodes bounding the area of expanse of the liquid crystal medium on opposite sides, means for creating selectable voltage across said electrodes, and hence across the area of expanse of said liquid crystal medium layer, and means for creating from said selectable voltage desired shading patterns within the interior space of the vehicle by creating different voltage gradients at different locations over the area of expanse of the liquid crystal medium layer wherein the different voltage gradients result from the liquid crystal medium layer having different thicknesses at different locations across its area of expanse corresponding to the desired shading patterns to be achieved within the interior space.

4. The combination set forth in claim 3 in which said liquid crystal medium progressively increases in thickness in the direction away from the top of the windshield.

5. The combination set forth in claim 4 including a control associated with said medium and comprising means presettable by an occupant of the interior space of the vehicle for setting the desired shading pattern in relation to the occupant's eyes.

6. The combination set forth in claim 5 in which said means presettable by an occupant comprises a potentiometer.

7. The combination set forth in claim 6 in which said control comprises means for causing said selectable voltage to be selected in accordance with the setting of said potentiometer by an occupant.

8. The combination set forth in claim 5 including a control associated with said medium and including a photocell responsive to sunlight shining onto the windshield, said control comprises means for rendering said photocell effective to control said selectable voltage.

9. The combination set forth in claim 8 in which a light shield is associated with said photocell and the light shield and photocell are relatively positionable to a predetermined relationship to the horizon.

10. The combination set forth in claim 9 in which the light shield is positionable in relation to the incidence of sunlight on the photocell in the same relationship as the liquid crystal medium is in relation to the incidence of sunlight on the eyes of the occupant.

11. The combination set forth in claim 8 in which the control includes means for vertically adjusting the shading provided by the medium such that the shading is caused to track the elevation of the sun above the horizon to maintain the shading in a desired relationship to the occupant's eyes for a given setting of the control by the occupant.

* * * * *